US012692859B2

(12) United States Patent
Stephenson et al.

(10) Patent No.: US 12,692,859 B2
(45) Date of Patent: Jul. 28, 2026

(54) VARIABLE TORQUE CONVERTER FOR BOREHOLE OPERATIONS

(71) Applicant: Halliburton Energy Services, Inc., Houston, TX (US)

(72) Inventors: Stanley Vernon Stephenson, Duncan, OK (US); Adam Lynn Marks, Duncan, OK (US); Brenden Chenoweth, Duncan, OK (US); Ronald Glen Dusterhoft, Waurika, OK (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/046,301

(22) Filed: Feb. 5, 2025

(65) Prior Publication Data
US 2025/0180008 A1 Jun. 5, 2025

Related U.S. Application Data

(62) Division of application No. 18/507,976, filed on Nov. 13, 2023, now abandoned.

(51) Int. Cl.
*F04B 49/06* (2006.01)
*E21B 43/26* (2006.01)
(Continued)

(52) U.S. Cl.
CPC ........ *F04B 49/065* (2013.01); *E21B 43/2607* (2020.05); *F04B 49/06* (2013.01);
(Continued)

(58) Field of Classification Search
CPC ........ F04B 49/065; F04B 49/06; F04B 49/08; F04B 49/20; F04B 9/02; F04B 15/02;
(Continued)

(56) References Cited

U.S. PATENT DOCUMENTS 11,697,985 B2 * 7/2023 Zhang .............. G06Q 10/06313
166/250.01
2021/0025383 A1 * 1/2021 Bodishbaugh ...... E21B 43/2607
(Continued)

OTHER PUBLICATIONS

Shellenberger; "Design considerations for variable power split hydraulic drives for industrial applications"; 1999; Graduate Theses, Dissertations, and Problem Reports. 956; West Virginia University, The Research Repository © WVU; https://researchrepository.wvu.edu/etd/956; 102 pgs.

*Primary Examiner* — Charles G Freay
(74) *Attorney, Agent, or Firm* — John Wustenberg; Parker Justiss, P.C.

(57) ABSTRACT

When conducting borehole operations, such as drilling, injection, or hydraulic fracturing, using a variable torque converter to reduce the torque force output of a constant speed engine or motor would enable a more efficient use of resources and lower costs due to less wear and tear on equipment. The fluid pump system at the borehole can utilize the variable torque converter, receiving operating commands from a control system, to reduce the torque delivered to the fluid pump to maintain operational parameters, such as a rate of change of load on the engine or motor, a maximum fluid pressure measured at the pump or downhole, or other operational parameters. The variable torque converter can be part of a transmission system, or be located before or after the transmission system. The variable torque converter can utilize torque oil or a magnetic system to control the torque force being delivered.

29 Claims, 9 Drawing Sheets

(51) Int. Cl.

| | |
|---|---|
| *F04B 9/02* | (2006.01) |
| *F04B 49/08* | (2006.01) |
| *F04B 49/20* | (2006.01) |
| *G06N 20/00* | (2019.01) |
| *E21B 47/06* | (2012.01) |
| *F04B 15/02* | (2006.01) |
| *F04B 17/03* | (2006.01) |
| *F04B 17/05* | (2006.01) |
| *G06N 5/04* | (2023.01) |

(52) U.S. Cl.

CPC .............. *F04B 49/08* (2013.01); *F04B 49/20* (2013.01); *G06N 20/00* (2019.01); *E21B 47/06* (2013.01); *F04B 9/02* (2013.01); *F04B 15/02* (2013.01); *F04B 17/03* (2013.01); *F04B 17/05* (2013.01); *G06N 5/04* (2013.01)

(58) Field of Classification Search

CPC ...... F04B 17/03; F04B 17/05; E21B 43/2607; E21B 47/06; G06N 20/00; G06N 5/04

See application file for complete search history.

(56) References Cited

U.S. PATENT DOCUMENTS

| | | |
|---|---|---|
| 2022/0275794 A1 | 9/2022 | Täuber |
| 2023/0167765 A1 | 6/2023 | Warren et al. |

* cited by examiner

VARIABLE TORQUE CONVERTER FOR BOREHOLE OPERATIONS

CROSS-REFERENCE TO RELATED APPLICATION

This application is a divisional application of U.S. application Ser. No. 18/507,976, filed by Stephenson, et al., on Nov. 13, 2023, entitled "VARIABLE TORQUE CONVERTER FOR BOREHOLE OPERATIONS,", currently abandoned, commonly assigned with this application and incorporated herein by reference in its entirety.

TECHNICAL FIELD

This application is directed, in general, to utilizing a fluid pump with borehole operations and, more specifically, to using a torque device with the pump.

BACKGROUND

When performing a borehole operation, for example, a drilling operation, an injection operation, or a hydraulic fracturing operation, a fluid pump system is used to pump borehole fluids downhole through the borehole. There is a need to optimize the pumping process. For example, the use of a constant speed natural gas engine, or constant speed electrical motor, to power a pump can result in an inability to control the maximum torque delivered to the pump or an unacceptable rate of change of torque placed on the engine. A sudden increase or decrease of load can stall the engine or cause pre-ignition knock. This can further result in problems with coming online under pressure, gear shifts, pressure testing, or overpressure events.

SUMMARY

In one aspect, a fluid pump system for use with a borehole operation of a borehole is disclosed. In one embodiment, the fluid pump system includes (1) a constant speed power mechanism capable of generating a torque, (2) a fluid pump capable of pumping a fluid suitable for the borehole operation using the torque generated by the constant speed power mechanism, (3) a control system capable of collecting input parameters from and communicating output parameters to electronically coupled systems, and generating at least one operating command using the input parameters, wherein the at least one operating command is one of the output parameters and at least one of the input parameters is an equipment parameter of the fluid pump system, and (4) a variable torque converter capable of reducing the torque generated by the constant speed power mechanism using the at least one operating command, prior to the torque being utilized by the fluid pump, wherein the variable torque converter, the constant speed power mechanism, and the fluid pump are electronically coupled systems.

In a second aspect, a well system is disclosed. In one embodiment, the well system includes (1) surface equipment for performing a borehole operation for a borehole formed through a subterranean formation, wherein the borehole is undergoing the borehole operation, and (2) a fluid pump system located to deliver a fluid to the borehole, the fluid pump system including (2a) a constant speed power mechanism capable of operating at a constant speed and generating a torque, (2b) a fluid pump capable of pumping the fluid suitable for the borehole operation, wherein the torque generated by the constant speed power mechanism is utilized by the fluid pump, (2c) a control system capable of collecting input parameters from electronically coupled systems and communicating output parameters to the electronically coupled systems, and (2d) a variable torque converter capable of reducing the torque generated by the constant speed power mechanism prior to the torque being utilized by the fluid pump utilizing a torque oil, and the variable torque converter, the constant speed power mechanism, and the fluid pump are the electronically coupled systems.

In a third aspect, a method of performing a fluid pumping operation at a borehole is disclosed. In one embodiment, the method includes (1) locating a variable torque converter between a constant speed power mechanism and a fluid pump, (2) determining an event for the fluid pump, wherein the event is determined by a borehole operation plan or received sensor data, wherein the event is used to determine an operating command, and (3) adjusting a torque delivered to the fluid pump by the constant speed power mechanism using the variable torque converter as directed by the operating command, wherein the constant speed power mechanism and fluid pump are located at a surface of the borehole, the fluid pump is capable of pumping borehole fluid down the borehole, and the borehole is for a hydrocarbon production operation.

BRIEF DESCRIPTION

Reference is now made to the following descriptions taken in conjunction with the accompanying drawings, in which.

DETAILED DESCRIPTION

Figure 1:
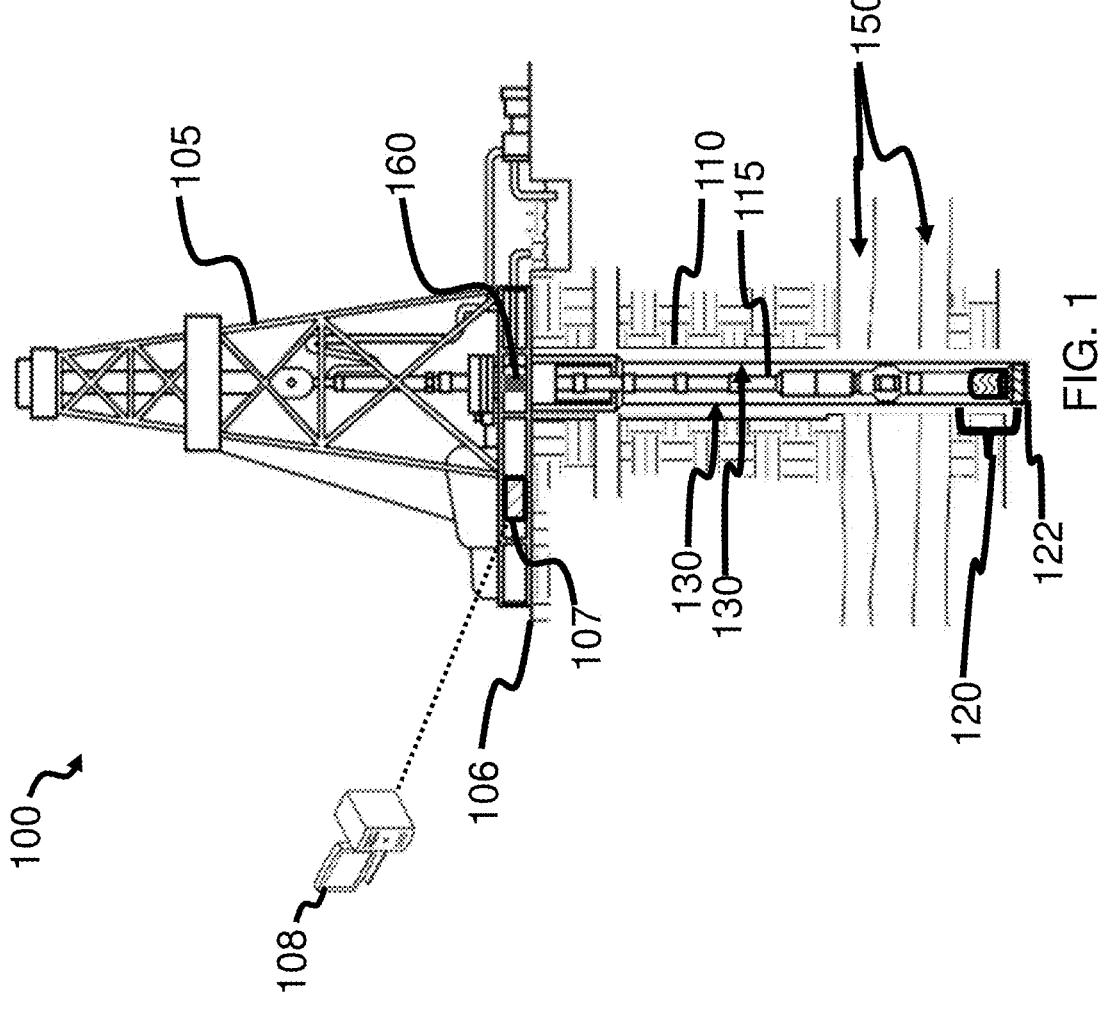
FIG. 1 is an illustration of a diagram of an example drilling system.

In a hydrocarbon well system, there is a need to pump a fluid, e.g., a borehole fluid, downhole a borehole. Hydrocarbons can be oil, gas, other desirable products found in a subterranean formation. The fluid can be a drilling mud, a drilling fluid, an extraction fluid, a hydraulic fracturing fluid, a cement, water, brine, water with additives, oil, or other fluid types. The fluid can include additives, such as chemicals, barite, sand, bauxite proppant, ceramic proppant, or other additives. The well system can be part of a drilling borehole system, an injection borehole system, a hydraulic fracturing borehole system, a production borehole system, or a completed borehole system.

Pumping systems need to handle various fluid types, at various pressures, and be able to convey the fluid thousands or tens of thousands of feet to the intended destination. The pumping systems can be under significant stress pumping the fluid (e.g., borehole fluid) under these circumstances. In addition, the pumping system has to be aware of the other equipment in use at the surface or within the borehole. For example, a fluid pipe, a casing, valves utilized, and other equipment each have their own maximum fluid pressure or fluid flow rate that can be handled within operating specifications. The pumping system has to regulate the output pressure of the fluid so as to maintain the pressure within the boundaries of the minimum and maximum fluid pressures of the coupled systems at the surface and within the borehole. The same applies to fluid flow rates, where the control of fluid flow rates through the system is important.

One of the methods to power the pumping system is to utilize a constant speed power mechanism, for example, an engine, such as a constant speed natural gas engine or a diesel engine, or a motor, such as an electric motor. The constant speed power mechanism can utilize one or more of fuel types, for example, natural gas, diesel, hydrogen, ammonia, propane, combinations of fuel types, or other fuels types. These constant speed power mechanisms have a start-up time and shut-down time when the constant speed power mechanism first starts to turn the pump or when the constant speed power mechanism slows down. In addition, conditions downhole, at the surface, or with the consistency/composition of the fluid can change. The pump pressure may exceed a specified maximum pressure under these changing conditions. The pump would need to reduce its force applied to the fluid to prevent excess wear and tear on the systems at the surface or downhole, or to reduce the incidence of an adverse reaction, such as a safety issue, a blowout, or other types of adverse reactions. The power applied to the pump, such as the torque force, can be reduced to allow for a soft start of the pump operation (e.g., a pump start operation), a soft end of the pump operation (e.g., a pump soft end operation), or to address changing conditions experienced downhole, at the surface, or with the fluid being pumped.

The use of constant speed power mechanisms to power the pump can result in the reduced ability to control the maximum torque delivered to the pump, or the reduced ability to control the rate of change of torque generated by the constant speed power mechanism. A sudden increase or decrease of a load can stall the constant speed power mechanism or cause preignition knock (such as when using a natural gas engine). Difficulty in handling sudden increase or decreases in load can result in problems during a coming online under pressure event, a gear shift event, a pressure testing event, an overpressure event, or other types of events.

Conventional torque converters used in the industry typically have an automatic transmission that is full of fluid a significant portion of the time, which may provide limited or no control over the input to output torque force when using a constant speed power mechanism. Some conventional torque converters use a water brake system that is connected to the front of an engine. The water brake system requires a large cooling system to handle the additional heat.

In this disclosure, a fluid pump system is presented that will enable a constant speed power mechanism to be utilized while enabling a variable amount of torque to be applied to the pump to improve efficiency and safety, while reducing excess wear and tear on the various components, such as surface equipment, downhole equipment, borehole integrity, casing integrity, or other components. The fluid pump system can be used for a borehole operation, such as a pressure test, a drilling operation, an extraction operation, a hydraulic fracturing operation, a cement operation, a fluid operation, a hydrocarbon production operation, or other types of borehole operations or events (as determined by a borehole operation plan, e.g., a plan describing actions to perform for a stage of borehole operations).

A variable torque converter can be used to implement this disclosure. In some aspects, the disclosed system can reduce the excess heat being generated by improving the control over the torque being delivered to the pump thereby reducing or eliminating the need for a cooling system. In some aspects, controlling the torque delivered from the constant speed power mechanism to the pump can allow the pressure at the pump to be controlled or the fluid flow rate at the pump to be controlled. The variable torque converter can reduce the maximum torque delivered from the constant speed power mechanism to a level that is better for the operation being conducted (such as hydraulic fracturing) or better for the equipment being used for the operation (such as limiting the fluid pressure on valves and pipes).

In some aspects, the variable torque converter can be a variable fill torque converter, such as one filled with a torque oil, hydraulic fluid, or other suitable torque force fluid. In some aspects, the variable fill torque converter can utilize a scoop driver to adjust the amount of torque reduction, where a position of the scoop driver can be specified as an output parameter from a control system.

The control system can be electronically coupled to other parts of the fluid pump system, for example, the constant speed power mechanism, the variable torque converter, the transmission (if present), and the pump. In some aspects, the control system can be electronically coupled to a machine learning system. In some aspects, the control system can be electronically coupled to other borehole systems, such as a well site controller, a reservoir controller, a cloud environment, a corporate system, or types of borehole related systems. The control system can receive input parameters and communicate output parameters to the electronically coupled systems to monitor and direct the operations of the fluid pump system. In some aspects, the control system can be capable of directing the variable torque converter to increase torque during pump start-up operations to match a rate of change parameter, to decrease torque during pump shut down operations to match a rate of change parameter, to decrease torque if a maximum fluid pressure is detected of the fluid in the pump, or adjust torque when a gear selection change is made of a coupled transmission (such as using a transmission gear selection parameter).

In some aspects, the input parameters to the control system can be one or more of a rotations per minute (RPM) of the constant speed power mechanism, a load on the constant speed power mechanism, an amount of torque reduction of the variable torque converter, a RPM of a transmission gear, a pressure of the fluid flowing through the pump, or other input parameters. In some aspects, the output parameters from the control system can be one or more of an operating parameter of the constant speed power mechanism, a requested torque parameter for the variable torque converter, a state parameter of a lock-up clutch (such as engaged or disengaged), a gear parameter for a transmission, an operating parameter of the pump, or other output parameters.

In some aspects, the variable torque converter can be an eddy current clutch, where the variable torque force is adjusted using a magnetic system rather than a fluid system. In some aspects, the fluid pump system can include a lock-up clutch to couple the constant speed power mechanism and the pump to the desired torque force. The state of the lock-up clutch can be controlled by an output parameter from the control system.

Being able to control the torque delivered to the pump allows the pump to be adjusted to meet changing conditions. For example, a ramp up of torque can be utilized during a start-up event, a ramp down of torque can be utilized during a stopping event, an adjustment of torque can be utilized during a gear change of a transmission, or a change in torque can be utilized when conditions change, such as a composition of the fluid. In some aspects, the amount of torque applied to the pump can be predetermined to the selected gear of the transmission so that the torque can be adjusted to the specified level during a gear change event.

Advantageously, variable torque converters are utilized herein for the specific requirements of borehole operations, such as monitoring surface equipment and downhole equipment for wear and tear, monitoring a change in composition of the pumped fluid (such as when additives are added to a drilling mud), and adjusting torque output utilizing externally collected data.

In some aspects, utilizing variable torque converters can enable the use of EPA emissions certified constant speed power mechanisms to drive mud or hydraulic fracturing pumps. The variable torque converter can enable a loading and unloading of the constant speed power mechanism in a manner that will not damage the constant speed power mechanism during typical borehole operations. This can result in a reduction of costs to fuel the constant speed power mechanism. For example, no diesel will be required on dual fuel units as a natural gas constant speed power mechanism can be used. There can be a reduction of $CO_2$ emissions since there can be a reduction in fuel use, especially a reduction of diesel fuel. In aspects using an engine, such as a natural gas engine, there can be a reduction in the total system natural gas utilized since electric systems typically encounter inefficiencies in converting shaft horsepower to kilowatts and then back to shaft horsepower to drive the pump.

Implementing the variable torque converter as part of the fluid pump system of a borehole operation can result in several benefits. In some aspects, controlling the rate at which torque is delivered from the constant speed power mechanism to the pump at a pump start-up event can provide a soft start-up in any of the selected transmission gears, while running the constant speed power mechanism at a maximum speed. This can allow for a limitation of the rate of torque rise to reduce the incidence of the constant speed power mechanism from stalling or being damaged from a sudden torque load. A controlled torque rise can also minimize the torque spikes on the pump, on the speed reducer, and on the transmission.

In some aspects, the variable torque converter can minimize heat generation when the variable torque converter is not in a lock-up state. The lower heat generation can be accomplished by controlling the amount of fluid in the variable torque converter such that there is enough fluid in the converter to generate the desired level of torque to operate the pump at the determined treating pressure. In some aspects, the pump can continue to rise in speed until the lock-up clutch on the variable torque converter can be engaged.

In some aspects, the variable torque converter can be predetermined such that a maximum torque (which can dictate the maximum pump pressure) can be set for each gear in the transmission. The various gears of the transmission can then be utilized while reducing the incidence of over-pressuring the fluid.

In some aspects, the variable torque converter can be utilized for pressure testing one or more parts of a borehole system, such as testing the pump, the fluid pipes, valves, or other parts of the borehole system. In some aspects, the variable torque converter can be adjusted when the lock-up clutch is disengaged to allow for a specified minimum load on the constant speed power mechanism. In some aspects, the variable torque converter can lower the torque force from the constant speed power mechanism to the pump at a controlled rate to avoid causing issues with the constant speed power mechanism. In some aspects, the variable torque converter can be adjusted to lower the delivered torque when an overpressure situation occurs, where the lowered delivered torque can be lowered to the specified maximum fluid pressure. In some aspects, the variable torque converter can lower the delivered torque to unload the constant speed power mechanism at a controlled rate when a quick to neutral gear transmission event occurs.

In some aspects, the variable torque converter can be implemented in place of a fully filled converter used conventionally. In some aspects, the variable torque converter can be implemented and mechanically coupled between the constant speed power mechanism and the transmission. In some aspects, the variable torque converter can be implemented and mechanically coupled between the transmission and the pump.

In some aspects, the transmission utilized, if present, in the fluid pump system can be a multi-gear transmission, a power split transmission, a twin shaft transmission, or other transmission types. In some aspects, a multi-gear transmission capable of providing multiple gears for the torque delivered to the pump can be used where the pump is physically coupled to the multi-gear transmission, and the multi-gear transmission is an electronically coupled system. In some aspects, the control system can specify a torque parameter for the variable torque converter when the control system specifies a gear change for the multi-gear transmission and where the torque parameter can be determined by a maximum fluid pressure of the fluid at the pump. In some aspects, the multi-gear transmission can be a power split transmission, and the power split transmission can determine, utilizing an output parameter from the control system, the gear or non-gear utilized in delivering the torque to the pump. In some aspects, the multi-gear transmission can be a twin shaft transmission. In some aspects, the variable torque converter can be located at one of between the constant speed power mechanism and the multi-gear transmission, between the multi-gear transmission and the pump, or as part of the multi-gear transmission.

In some aspects, a machine learning system can be utilized to control the variable torque converter under various scenarios, for example, a change in constant speed power mechanism speed, a change in transmission gears, or a change in fluid pressure. In some aspects, the machine learning system can be capable of directing operations of the control system, wherein the machine learning system receives the input parameters communicated to the control system and learning parameters from previous borehole operations at the borehole, borehole operations from other boreholes, or lab experimentation.

In some aspects, the machine learning system can be utilized when a sensor fails, such as a speed sensor, a pressure sensor, or a transmission sensor. The machine learning system is inclusive of various types of machine learning systems that use machine learning algorithms, such as a digital twin system, an artificial intelligence system, a neural network system, a deep learning system, or other types of learning systems. The machine learning system can use trained models for directing operations of the control system. In some aspects, the machine learning system can be located in a control system of the fluid pump system.

In some aspects, the machine learning system can be located in a separate computing system from the control system. The separate computing system can be located proximate the fluid pump system or be distant from the fluid pump system. In some aspects, the separate computing system can be located in a cloud environment, a data center, a local computing system (a laptop, a server, a mobile device, or other types), an edge computing system, a corporate environment, a laboratory, or other locations.

Some example implementations are presented. In some aspects, a soft start (i.e., the start-up event) can be implemented by specifying the variable torque converter to minimize the torque delivered to the pump. The constant speed power mechanism can be operating at its maximum speed. To start the pump, the variable torque converter can increase the delivered torque at a rate such that the torque increase on the constant speed power mechanism can be kept below a specified threshold of rate of change of torque. The controlled rate of change of torque can allow the constant speed power mechanism to respond to the increased demand for torque without causing a stalling event or another type of event that can cause a problem with the constant speed power mechanism maintaining its maximum speed. As the pump and the torque generation part of the constant speed power mechanism approach the same speed, a lock-up clutch can lock the constant speed power mechanism speed to the pump speed so that there is no heat inducing shear in the variable torque converter. The soft start process can have the full horsepower capabilities at start-up thereby enabling the system to come on-line under a pressure.

In some aspects, a gear shift event can be implemented. Prior to a gear shift within the transmission, the variable torque converter can be adjusted so that the rate of change of torque on the constant speed power mechanism remains below the specified threshold level when the lock-up clutch is released. The appropriate clutches in the transmission can then be engaged for the selected gear. The variable torque converter can then be adjusted as described for the soft start process until either the lock-up clutch is re-engaged or a maximum pressure is reached. In some aspects, if a maximum pressure is reached, a gear downshift can be utilized to maintain the operations within the maximum fluid pressure.

In some aspects, an overpressure control can be implemented. During pumping operations and when the lock-up clutch is engaged, the variable torque converter can be adjusted to a level such that when the lock-up clutch is disengaged in the event of an overpressure event, the torque delivered to the pump can be limited to the maximum fluid pressure for the active borehole operation. This can maintain a load on the constant speed power mechanism that is then released. In some aspects, the load can be reduced to zero while staying below the threshold of the rate of change of torque.

In some aspects, the use of available gears in the transmission can be increased. In some conventional systems, some gears are locked out due to the lack of torque control being delivered through the fluid pump system. Limits can be specified or set on the variable torque converter for each gear in the transmission to reduce or avoid an overpressure event using each respective gear. Various factors can be utilized to determine the limit on the torque, for example, the maximum pressure at the pump discharge point, the pump fluid end size, the gear ratio of the pump speed reducer, the ratio of each gear in the transmission, and other factors. This can enable the use of more gears within the transmission for use by the fluid pump system.

Turning now to the figures, FIG. 1 is an illustration of a diagram of an example drilling system 100, for example, a logging while drilling (LWD) system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is an example of equipment of drilling system 100 that is located at a surface 106 (i.e., surface equipment).

Extending below derrick 105 is a borehole 110 with downhole tools 120 at the end of a drill string 115. Downhole tools 120 can include various downhole tools, such as a formation tester or a bottom hole assembly (BHA). Downhole tools 120 can include a resistivity tool or an ultra-deep resistivity tool. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150. Casing 130 can act as barrier between subterranean formation 150 and the fluids and material internal to borehole 110, as well as drill string 115.

Well site controller 107 or computing system 108 which can be communicatively coupled to well site controller 107, can be utilized to communicate with downhole tools 120, such as sending and receiving acoustic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known, or later developed, to direct operations of downhole tools 120.

A fluid pump system 160 is located proximate surface 106. Fluid pump system is coupled to a fluid source, for example, drilling mud, hydraulic fracturing fluid, injection fluid, extraction fluid, or other types of fluid. Fluid pump system 160 includes a constant speed power mechanism, a fluid pump, and a variable torque converter. Optionally, fluid pump system 160 can include a transmission, a control system, a machine learning system, or other additional components. Fluid pump system 160 can pump drilling fluid down borehole 110 while maintaining the pump pressure below a specified maximum fluid pressure. This can be accomplished by reducing the total torque output of the constant speed power mechanism delivered to the pump by using the variable torque converter.

Well site controller 107 or computing system 108 can direct the operations of fluid pump system 160, such as communicating one or more operating commands to fluid pump system 160. The control system of fluid pump system 160 can be located as part of fluid pump system 160 or be located as part of well site controller 107 or computing system 108. The machine learning system of fluid pump system 160 can be located as part of fluid pump system 160, part of the control system, or be located as part of well site controller 107 or computing system 108. The control system can receive input parameters from computing system 108, for example, receiving lab or experimental data on a torque level for each gear included with the transmission.

Figure 2:
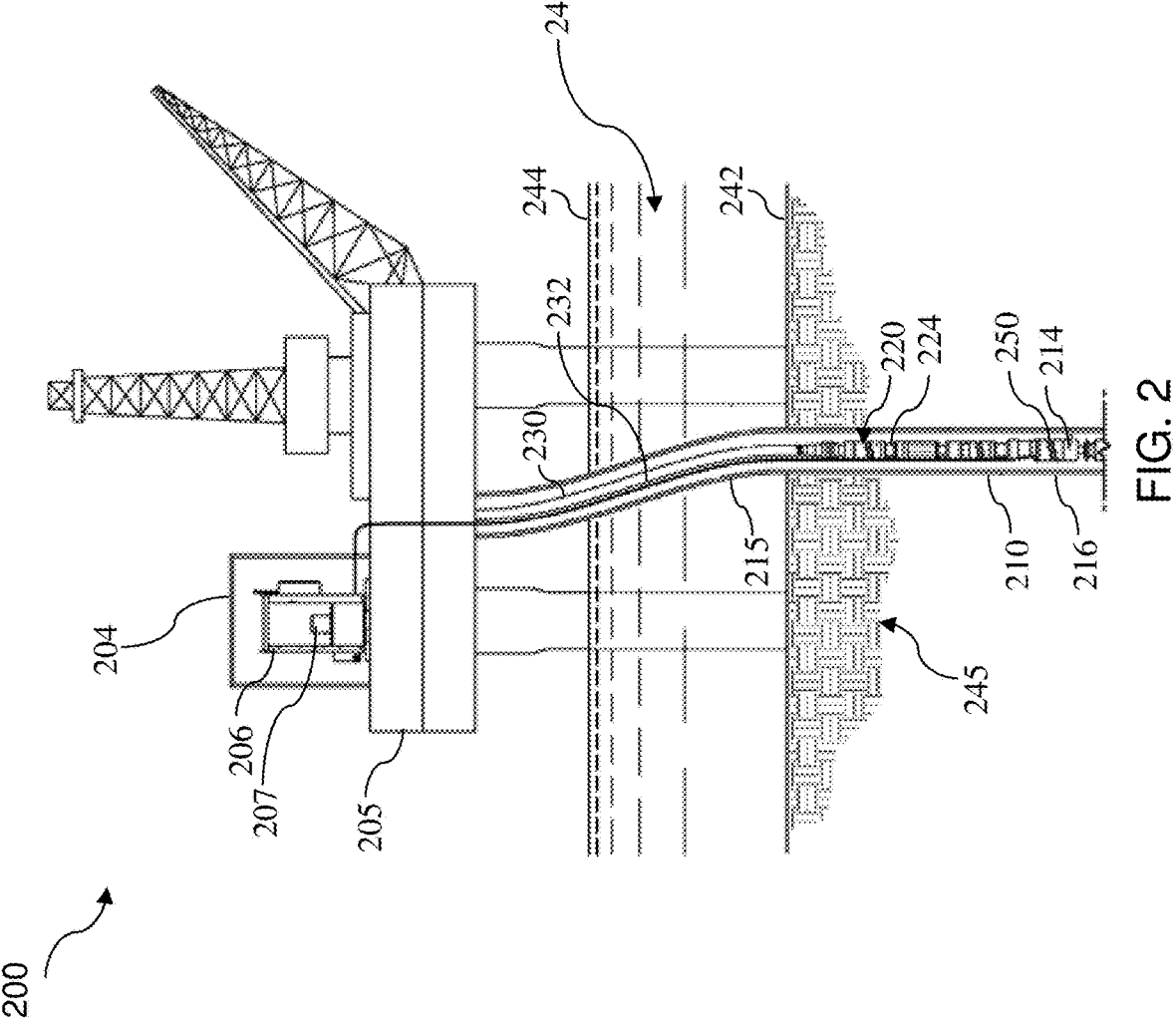
FIG. 2 is an illustration of a diagram of an example offshore well system.

FIG. 2 is an illustration of a diagram of an example offshore well system 200 with an electric submersible pump (ESP) assembly 220. ESP assembly 220 is placed downhole in a borehole 210 below a body of water 240, such as an ocean or sea. Borehole 210, protected by casing, screens, or other structures, is surrounded by subterranean formation 245. ESP assembly 220 can be used for onshore operations. ESP assembly 220 includes a well controller 207 (for example, to act as a speed and communications controller of ESP assembly 220), an ESP motor 214 (e.g., the constant speed power mechanism), and an ESP pump 224 (e.g., the fluid pump).

Well controller 207 may be placed in a cabinet 206 inside a control room 204 on an offshore platform 205, such as an oil rig, above water surface 244. Well controller 207 may be configured to adjust the operations of ESP motor 214 to improve well productivity. In the illustrated aspect, ESP motor 214 is a two-pole, three-phase squirrel cage induction motor that operates to turn ESP pump 224. ESP motor 214 is located near the bottom of ESP assembly 220, just above downhole sensors within borehole 210. An energy/communication cable 230 extends from well controller 207 to ESP motor 214. A tubular 232 fluidly couples equipment located on offshore platform 205 and ESP pump 224.

In some aspects, ESP pump 224 can be a horizontal surface pump, a progressive cavity pump, a subsurface compressor system, or an electric submersible progressive cavity pump. A motor seal section and intake section may extend between ESP motor 214 and ESP pump 224. A riser 215 separates ESP assembly 220 from water 240 until sub-surface 242 is encountered, and a casing 216 can separate borehole 210 from subterranean formation 245 at and below sub-surface 242. Perforations in casing 216 can allow the fluid of interest from subterranean formation 245 to enter borehole 210.

Located between ESP motor 214 and ESP pump 224 is a variable torque converter 250. Variable torque converter 250 can be a variable fill torque converter using a torque oil or an eddy clutch using a magnetic system. Variable torque converter 250 can be directed by a control system, such as well controller 207, to control the delivered torque from ESP motor 214 to ESP pump 224, thereby maintaining the fluid pressure at ESP pump 224 at or below a maximum threshold. A transmission can be included as well, where variable torque converter 250 can be located before or after the transmission in the torque coupling, and where variable torque converter 250 can adjust the delivered torque as gears are shifted within the transmission.

Figure 3:
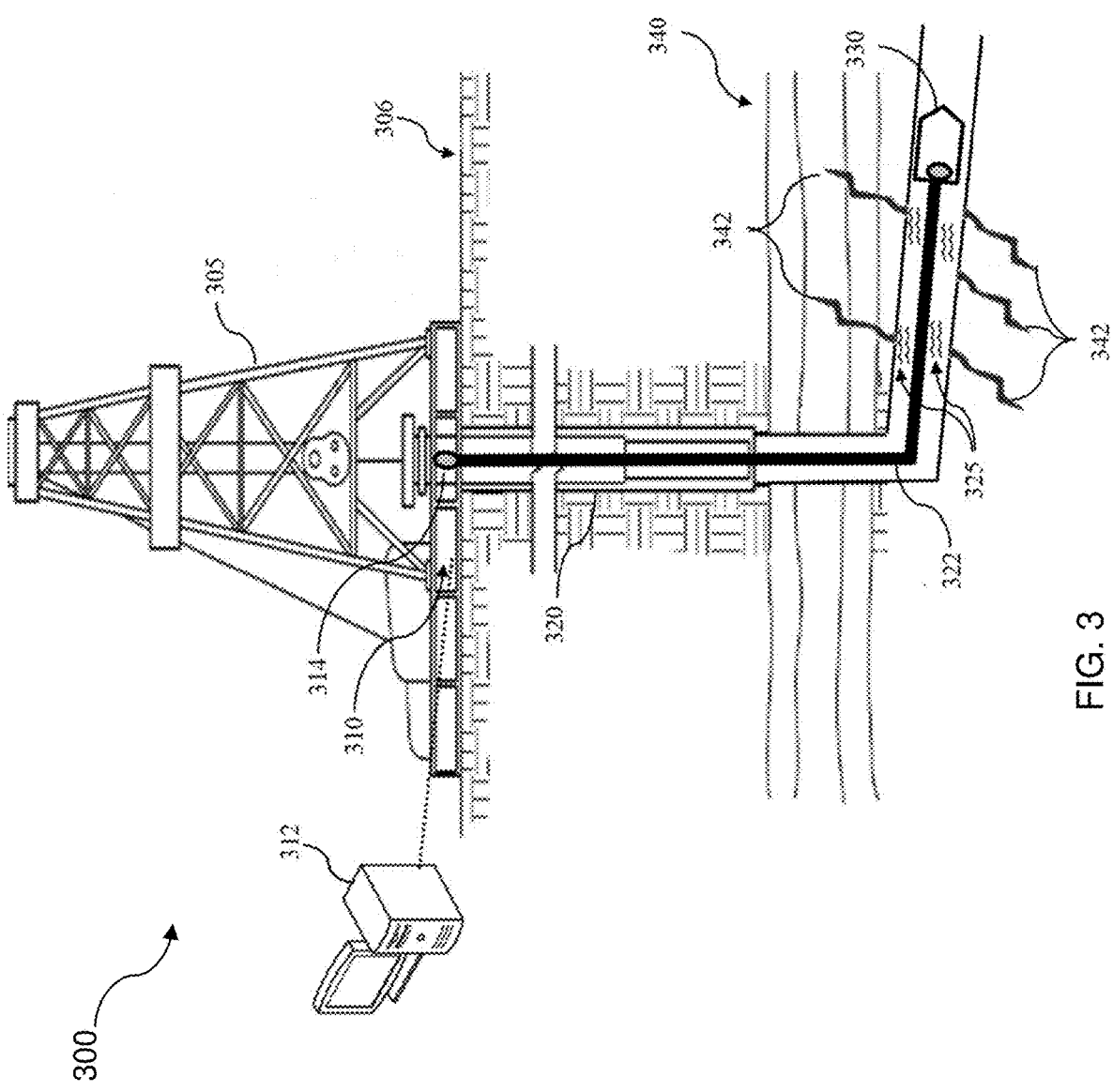
FIG. 3 is an illustration of a diagram of a hydraulic fracturing well system.

FIG. 3 is an illustration of a diagram of a hydraulic fracturing (HF) well system 300, which can be a well site where HF operations are occurring through the implementation of a HF treatment stage plan. HF well system 300 demonstrates a nearly horizontal wellbore undergoing a fracturing operation.

HF well system 300 includes a surface well equipment 305 located at a surface 306, a well site control equipment 310, and a HF pump system 314 (e.g., a fluid pump system). The HF pump system 314 includes at least one pump to pump downhole material 325. The downhole material 325 can be obtained from a blender or tank, which are not shown in FIG. 3. In some aspects, well site control equipment 310 is communicatively connected to a separate computing system 312, for example, a separate server, data center, cloud service, tablet, laptop, smartphone, or other types of computing systems. Computing system 312 can be located proximate to well site control equipment 310 or located a distance from well site control equipment 310, and can be utilized by a well system engineer and operator to review the diversion model stemming from the calibration process.

Extending below surface 306 from surface well equipment 305 is a wellbore 320. Wellbore 320 can have zero or more cased sections and a bottom section that is uncased. Inserted into the wellbore 320 is a fluid pipe 322. The bottom portion of fluid pipe 322 has the capability of releasing downhole material 325, such as carrier fluid with diverter material, from fluid pipe 322 to subterranean formations 340. The release of downhole material 325 can be by perforations in fluid pipe 322, by valves placed along fluid pipe 322, or by other release means. At the end of fluid pipe 322 is a bottom hole assembly (BHA) 330, which can be one or more downhole tools or an end cap assembly.

In HF well system 300, fluid pipe 322 is releasing downhole material 325 into subterranean formation 340 at a determined HF fluid pressure and HF fluid flow rate. Downhole material 325 is being absorbed by, e.g., enter or flowing into, several fractures 342. Well site control equipment 310 can include a well site parameter collector that can collect sensor data from one or more fluid sensors proximate to the well site, located at a surface location, such as part of HF pump system 314, and located downhole within wellbore 320, such as a downhole HF fluid pressure gauge and a distributed acoustic sensor. This sensor data can be received as input parameters to well site control equipment 310.

Well site control equipment 310 and computing system 312 can direct HF pump system 314 to adjust the torque delivered to the pump to control the HF fluid pressure and the HF fluid flow rate. In some aspects, well site control equipment 310 can include a machine learning system to anticipate events that would need a change of the delivered torque using the input parameters, such as when downhole conditions change, the composition of the fluid changes, or gears in a connected transmission have been instructed to change by well site control equipment 310.

While FIGS. 1 and 3 depict onshore operations, those skilled in the art will understand that the disclosure is equally well suited for use in offshore operations, such as shown in FIG. 2. FIGS. 1-3 depict specific borehole configurations, and those skilled in the art will understand that the disclosure is equally well suited for use in boreholes having other orientations including vertical boreholes, horizontal boreholes, slanted boreholes, multilateral boreholes, and other borehole types. FIGS. 1-3 depict certain types of pumping operations, and those skilled in the art will understand that the disclosure can apply to drilling operations, production operations, intercept operations, relief well operations, completion operations, hydraulic fracturing operations, measure while drilling operations, logging while drilling operations, seismic while drilling operations, completed borehole operations, production testing operations, slickline or wireline operations, coiled tubing string remediation, seismic profiling, and other types of borehole operations without departing from the scope of the disclosure. For example, the disclosure can apply to a drilling borehole system, an injection borehole system, a hydraulic fracturing borehole system, a production borehole system, or a completed borehole system. The borehole operations can be to produce oil or gas products, or for scientific purposes, research, testing, or other non-hydrocarbon related purpose.

Figure 4:
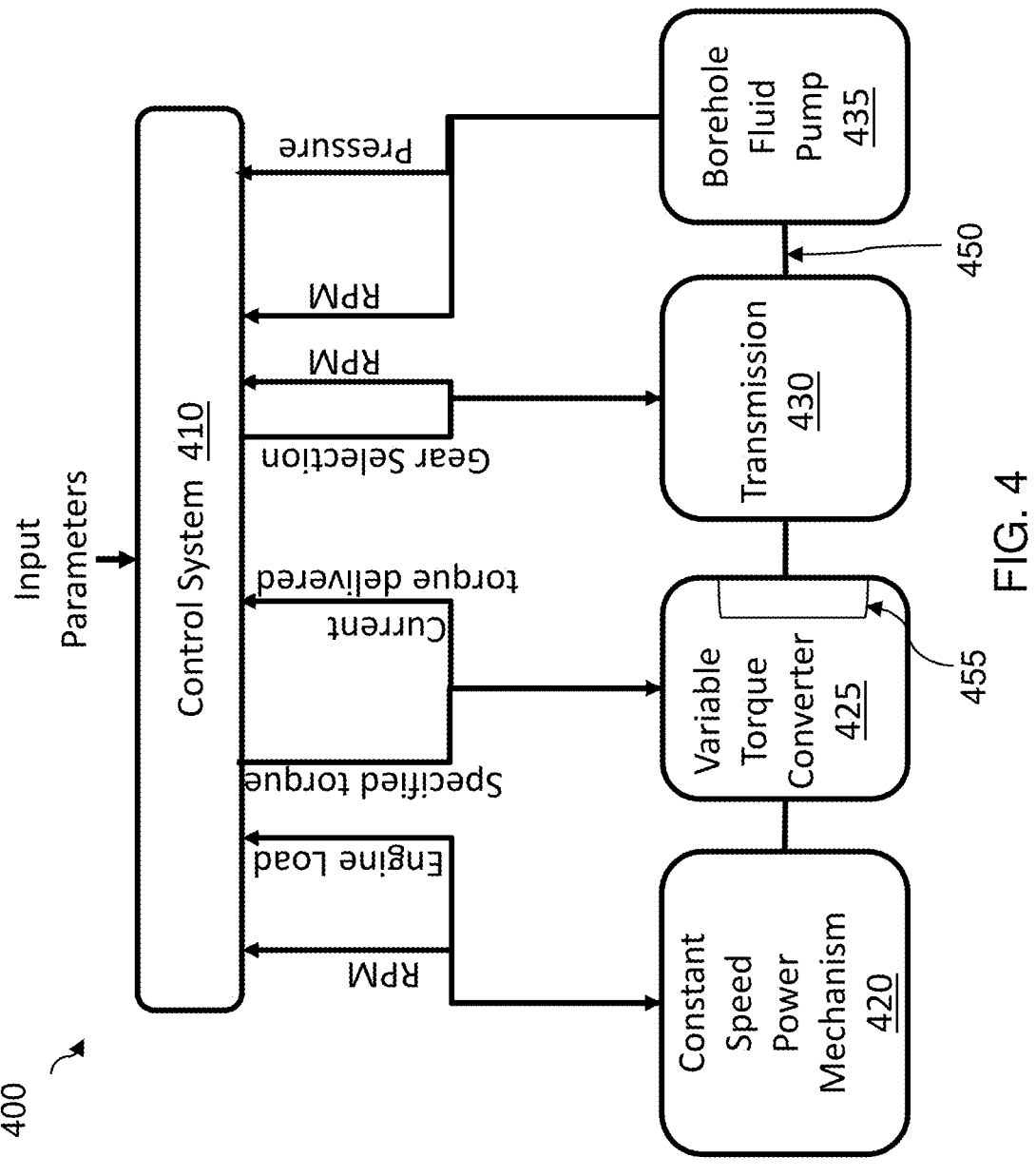
FIG. 4 is an illustration of a block diagram of a fluid pump system.

FIG. 4 is an illustration of a block diagram of a fluid pump system 400. Fluid pump system 400 can be a pumping system for a borehole operation, such as a drilling operation, an injection operation, a hydraulic fracturing operation, or other operations. Fluid pump system 400 can pump a drilling mud, an injection fluid, a hydraulic fracturing fluid, or other fluids types, which can depend on the borehole operation.

Fluid pump system 400 has a control system 410 that is capable of receiving input parameters and communicating output parameters, a constant speed power mechanism 420 capable of generating torque, a variable torque converter 425 capable of reducing the torque received from constant speed power mechanism 420, an optional transmission 430 capable of having multi-gears for selection and use, and a pump 435 capable of pumping a borehole fluid downhole a borehole. Control system 410 can be included in another well site system or be part of fluid pump system 400. For example, control system 410 can be a computing system within fluid pump system 400, be part of a well site controller (such as well site controller 107), be part of a computing system (such as computing system 108), or be part of other well site equipment.

In some aspects, the input parameters can include sensor measurements from sensors located proximate the borehole such as a downhole fluid pressure, a drill pipe pressure, a fluid composition parameter, a fluid flow rate parameter, or other sensor measurements. Input parameters, such as from the sensors, are represented by the arrow in FIG. 4. In some aspects, the input parameters can include equipment parameters of fluid pump system 400, for example, a RPM for constant speed power mechanism 420, a load on constant speed power mechanism 420, a torque output of constant speed power mechanism 420, a start-up or shut down mode of constant speed power mechanism 420, a transmission gear selection parameter of transmission 430, a RPM of transmission 430, an amount of torque reduction currently being applied by variable torque converter 425, a fluid pressure at pump 435, a fluid flow rate at pump 435, or other types of equipment parameters. In some aspects, the input parameters can include specified parameters, such as a maximum allowable fluid pressure at pump 435, a maximum allowable pressure downhole, a maximum allowable fluid pressure for selected gears in transmission 430, or other specified parameters. In some aspects, the input parameters can include inputs into a machine learning system, for example, learnings from lab or experiments, learnings from the current or other boreholes, or other machine learning inputs, where the learnings can be used to determine operating commands of variable torque converter 425.

In some aspects, the output parameters can be one or more operating commands to the equipment of fluid pump system 400, for example, a gear change of the transmission, a start-up or shut down event communicated to constant speed power mechanism 420, a requested torque parameter delivered through variable torque converter 425, or other operating commands. The output parameters can be communicated to more than one equipment, such as transmission 430 and variable torque converter 425 so that the equipment can synchronize their respective changes to optimize the delivered torque. In some aspects, the output parameters can include a state parameter of a lock-up clutch (such as to engage or disengage the clutch), a change in an operating parameter of pump 435 (such as a change in valve position), or a change in an operating parameter of constant speed power mechanism 420 (such as an emergency shut down command). In some aspects, the output parameters can be communicated to a machine learning system to improve the determinations made by the machine learning system or can be communicated to other data storage systems, for example, for use in other fluid pump systems located at other boreholes or to improve algorithms implemented to control fluid pump system 400 or other fluid pump systems.

Constant speed power mechanism 420 can generate a torque force and deliver it to either variable torque converter 425, to transmission 430, or to a combination of equipment. In some aspects, variable torque converter 425 can be located between constant speed power mechanism 420 and transmission 430, between transmission 430 and pump 435, or be part of transmission 430.

Constant speed power mechanism 420 can be a natural gas engine, a spark ignited engine, an electric motor, or other types of constant speed power mechanisms powered using various energy sources. Variable torque converter 425 can be a variable fill torque converter utilizing a torque oil or an eddy clutch torque converter utilizing a magnetic system. Transmission 430 can be one of a multi-gear transmission, a power spilt transmission, or a twin shaft transmission.

In some aspects, fluid pump 400 system can utilize variable torque converter 425 that is incorporated within transmission 430, where the standard constantly full torque converter is replaced with variable torque converter 425. Control system 410 can communicate operating commands to adjust the scoop tube to the desired position to provide the requested rate of change of load on constant speed power mechanism 420. Either the fluid pressure measured at pump 435 or the engine load measured at constant speed power mechanism 420 can be used to control the rate of change of load to ensure that it remains under the maximum load threshold. Data collected from sensors at constant speed power mechanism 420, variable torque converter 425, transmission 430m or pump 435 can be used as input parameters to control the load on constant speed power mechanism 420. Performance data can be collected and stored for further analysis, such as used by the machine learning system.

Figure 5:
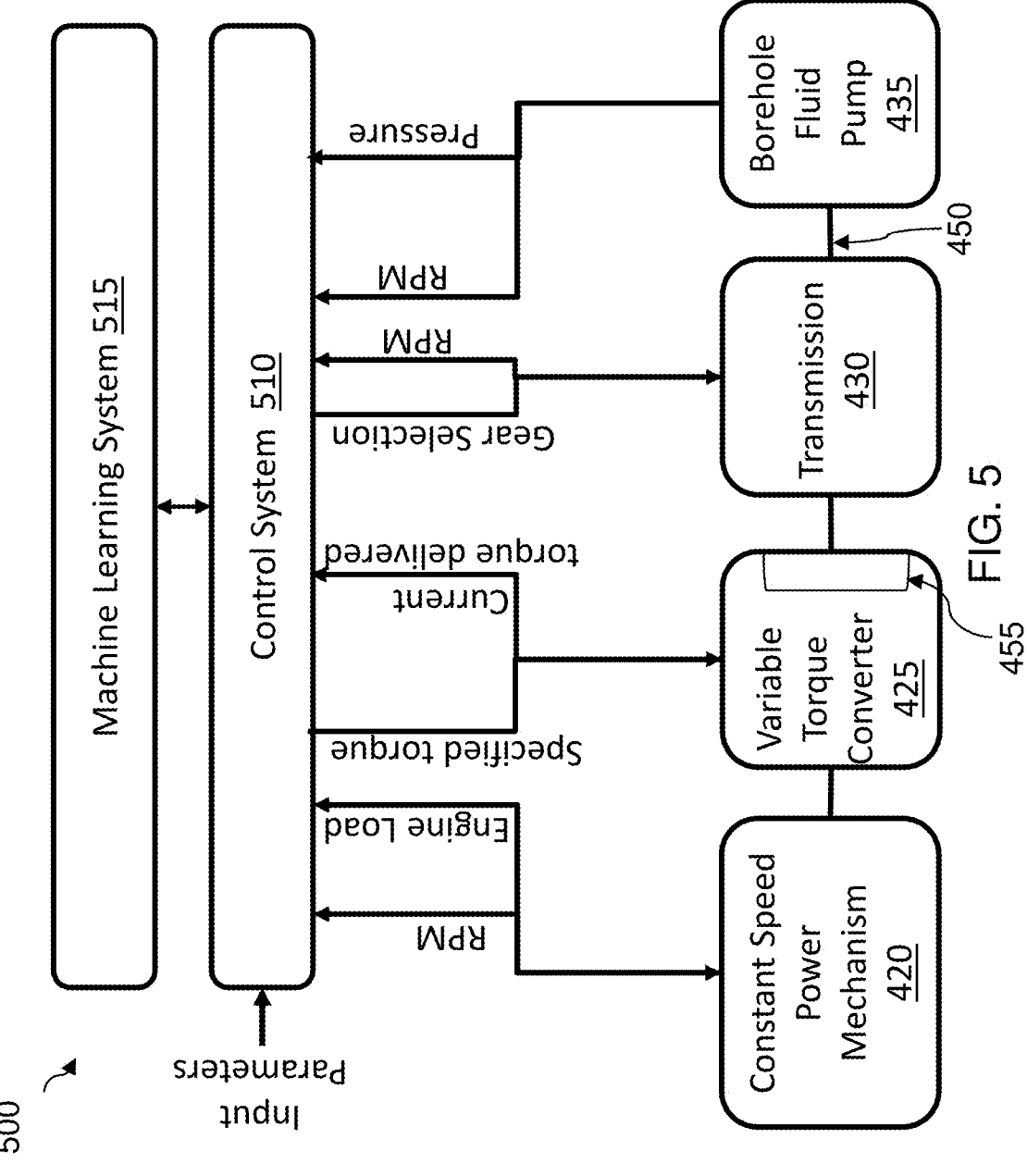
FIG. 5 is an illustration of a block diagram of a fluid pump system with a machine learning system.

FIG. 5 is an illustration of a block diagram of a fluid pump system 500 with a machine learning system. Fluid pump system 500 is similar to fluid pump system 400 with the addition of a machine learning system 515. Control system 510 is similar to control system 410 and further capable of communicating with machine learning system 515.

Machine learning system 515 can receive the input parameters and recommend output parameters to control system 510, the recommendations are determined using the input parameters and algorithms included with machine learning system 515. For example, for the ambient borehole conditions, such as a downhole pressure, machine learning system 515 can specify a torque parameter when a gear change is being made in the transmission so that the overall fluid pressure or fluid flow rate does not exceed a maximum parameters that has been specified. This can prevent an overpressure event downhole when a new gear is engaged at the transmission.

Machine learning system 515 can be located as part of control system 510, proximate control system 510, or a distance away from control system 510 (for example, a data center, cloud environment, an edge system, or other types of computing systems). Machine learning system 515 can be part of a well site controller (such as well site controller 107) or a computing system (such as computing system 108).

Figure 6:
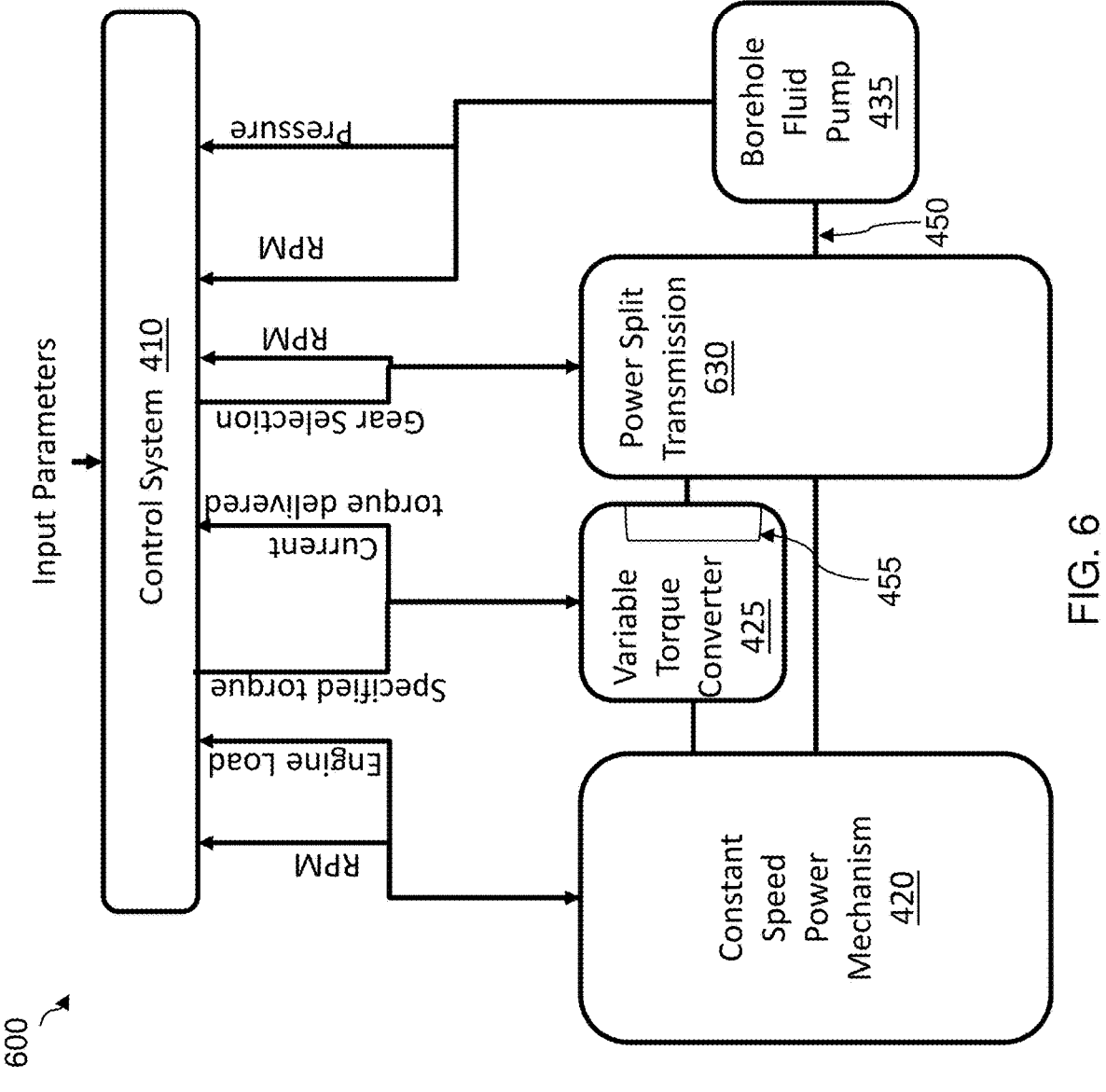
FIG. 6 is an illustration of a block diagram of a fluid pump system with a power split transmission.

FIG. 6 is an illustration of a block diagram of a fluid pump system 600 with a power split transmission. Fluid pump system 600 is similar to fluid pump system 400 with a change of transmission to a power split transmission 630. Constant speed power mechanism 420 is further capable of delivering torque two ways, one to variable torque converter 425 and one to power split transmission 630. In some aspects, control system 410 can generate an operating command that instructs the system to generate more torque than available from the variable torque converter 425. This aspect is indicated by the direct connection from constant speed power mechanism 420 to the power split transmission 630.

Figure 7:
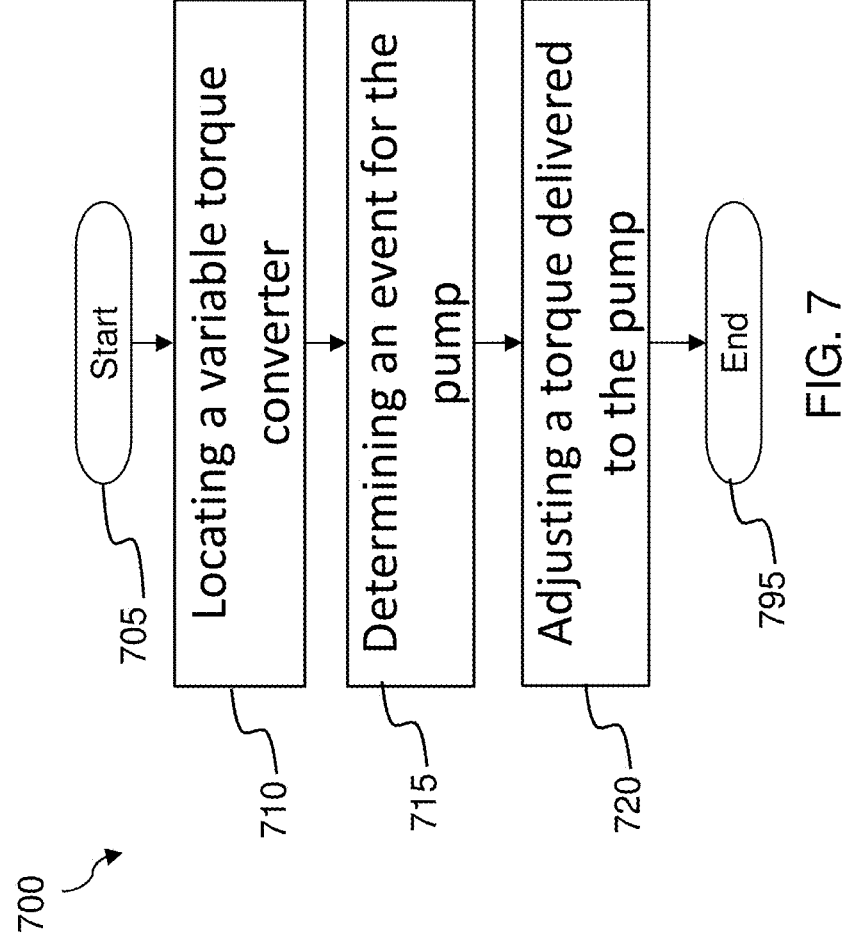
FIG. 7 is an illustration of a flow diagram of an example method for using a fluid pump system with a variable torque converter.

FIG. 7 is an illustration of a flow diagram of an example method 700 for using for using a fluid pump system with a variable torque converter. Method 700 can be partially performed on a computing system, for example, fluid pump system 800 of FIG. 8. The computing system can be a downhole tool, a bottom hole assembly, a well site controller, a geo-steering system, a reservoir controller, a hydraulic fracturing controller, a data center, a cloud environment, a server, a laptop, a mobile device, a smartphone, a PDA, or other computing system capable of receiving the input parameters and capable of communicating with other computing systems. Method 700 can be partially encapsulated in software code or in hardware, for example, an application, code library, dynamic link library, module, function, RAM, ROM, and other software and hardware implementations. The software can be stored in a file, database, or other computing system storage mechanism. Method 700 can be partially implemented in software and partially in hardware. The algorithmic portions of method 700 can be part of the control system of the fluid pump system, such as control system 410.

Method 700 starts at a step 705 and proceeds to a step 710. In step 710, a variable torque converter can be located between a constant speed power mechanism and a borehole fluid pump such that the variable torque is capable of reducing the torque delivered by the constant speed power mechanism to the pump. The variable torque converter can be part of a transmission, be located before, or after the transmission in the physical coupling of the fluid pump system equipment.

In a step 715, an event can de determined in the operation of the fluid pump system. The event can be one of a start-up of the constant speed power mechanism, a shut down of the constant speed power mechanism, a stalling potential threshold, a change of gears in the transmission, a quick to neutral of the transmission, an input parameter that indicates a fluid pressure or a fluid flow rate is at, has exceeded, or is close to exceeding a maximum threshold, a test parameter such as for an overpressure test.

The change in gears can be recommended by the control system, the constant speed power mechanism, or is a result of input parameters received. The threshold can be determined at a value where the fluid pump system can react to reduce the pressure or flow rate to reduce the safety failure of equipment or to reduce the wear and tear of equipment, such as pipes, valves, casing, or other borehole equipment. The input parameter can be representing the state of the fluid at the pump, downhole, or elsewhere within the borehole or other equipment. The input parameter can be received from a downhole sensor, an uphole sensor, a fluid pump system sensor or equipment, or other sensors proximate or in the borehole. Other events can be identified and used as inputs to the control system of fluid pump system to determine if a change in the variable torque converter is recommended.

In a step 720, the control system, or optional machine learning system, can determine a new parameter for the variable torque converter. This operating command, e.g., output parameter, can be communicated to the variable torque converter so a change in delivered torque can be made. In some aspects, the operating command can be a relative torque adjustment. For example, when using a torque oil based converter, a change in relative position of a scoop driver can be recommended. In some aspects, the operating command can be a recommendation for a torque force amount. For example, when using a torque oil based converter, the variable fill torque converter can adjust the scoop driver to a position that will result in the requested amount of torque being delivered. Method 700 ends at a step 795.

For further method exemplifications, a soft start event can be described. At the start of processing the event, a scoop tube (when using a torque oil type of converter) can be inserted to its maximum depth to result in minimal or zero torque being delivered. The constant speed power mechanism can be powered up to its maximum running speed. The scoop tube can be withdrawn at a rate such that the torque increase on the constant speed power mechanism can be kept below a rate of change of torque threshold that can allow the constant speed power mechanism to respond to the increased torque demand without stalling or having other problems maintaining the maximum speed. As the pump and the constant speed power mechanism near the same speed, a lock-up clutch can lock the constant speed power mechanism to the pump such that there is no heat inducing shear in the converter. The soft start can have full horsepower capabilities at start-up thereby enabling the fluid pump system to come online under pressure.

A second example can be for shifting gears event in the transmission. Prior to initiating the gear shift, the scoop tube (when using a torque oil based converter) can be adjusted to a depth such that the amount of fluid in the converter can keep the rate of change of torque on the constant speed power mechanism to be at or below the threshold level when the lock-up clutch is released. At this point, the appropriate clutches in the transmission can be engaged for the next gear and the scoop tube can be adjusted using the same process as described for the soft start until the lock-up clutch can be re-engaged or the maximum pressure is reached, at which time an overpressure event can be triggered.

A third example can be for an overpressure event, e.g., an overpressure control event. While pumping, and the variable torque converter lock-up clutch is engaged, the scoop tube can be adjusted to a level such that when the lock-up clutch is disengaged in the event of an overpressure event, the amount of fluid in the converter can limit the torque to a level that will not exceed the specified maximum fluid pressure. When a transmission is being utilized, each gear can have its own specific maximum fluid pressure threshold parameter. This can keep the load on the constant speed power mechanism that is then released as described for shifting gears except that the load can be reduced to the minimum allowable amount while staying below the load rate of change threshold for the constant speed power mechanism.

A fourth example can be to use all of the gears in a transmission. A limit can be set on the scoop depth (when using a torque oil converter) for each gear to reduce the chance of an overpressure event occurring. The scoop depth can be determined by using the input parameters of the maximum pressure of the pipe being used, the pump fluid valve capability, the gear ratio of the pump to the ratio of each gear, and other input parameters. This can allow the full speed range of the transmission rather than having to lock out certain gears as is sometimes down in conventional systems.

Examples one through four above are described using a variable fill torque converter. These examples can also utilize an eddy clutch, where the scoop driver position is replaced with an amount of magnetic power applied to adjust the amount of delivered torque.

Figure 8:
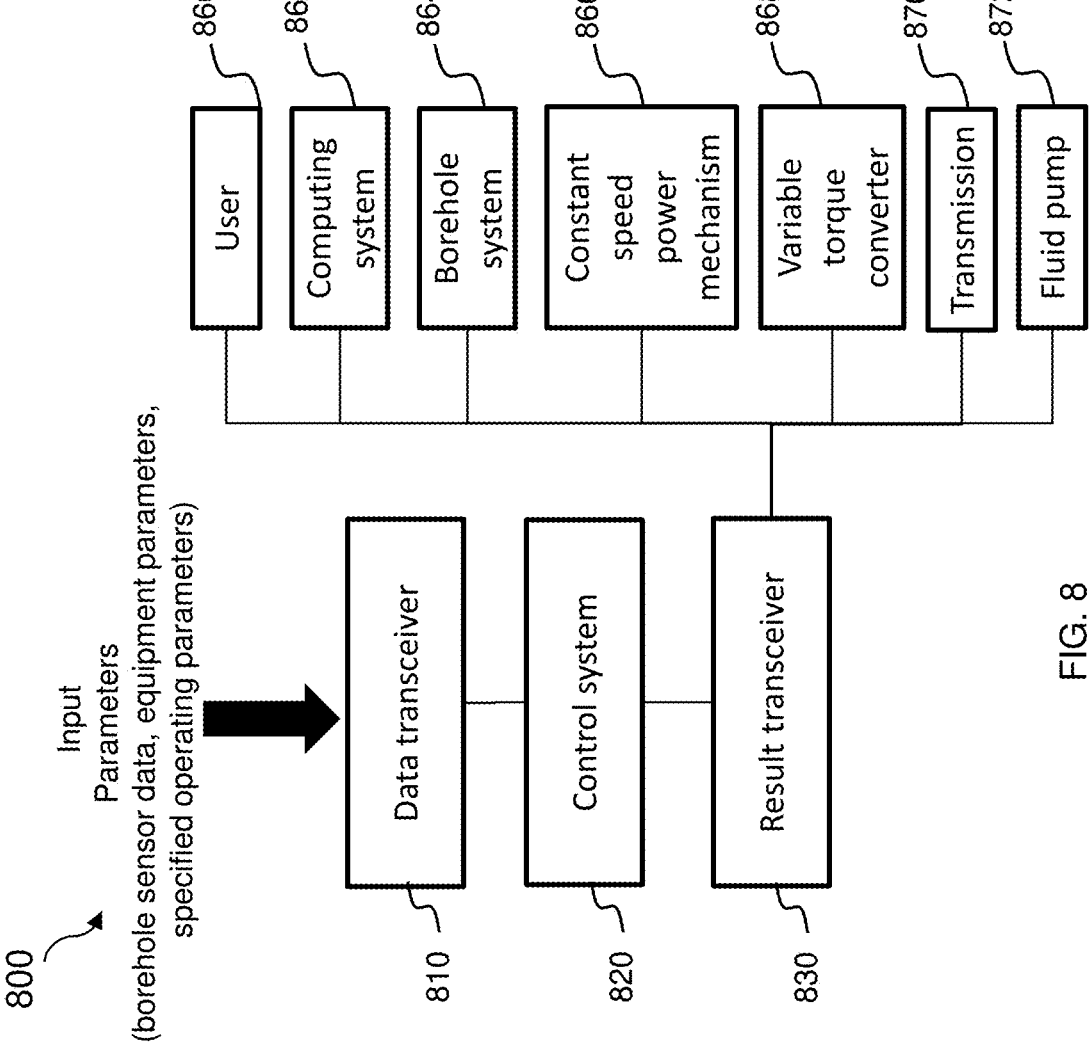
FIG. 8 is an illustration of a block diagram of an example of a fluid pump system.

FIG. 8 is an illustration of a block diagram of an example fluid pump system 800, which can be partially implemented in one or more computing systems, for example, a downhole tool, a hydraulic fracturing controller, a well site controller, a data center, cloud environment, server, laptop, smartphone, tablet, and other computing systems. In some aspects, fluid pump system 800 can be implemented using a fluid pump system controller such as fluid pump system controller 900 of FIG. 9. Fluid pump system 800 can implement the computing portions of one or more methods of this disclosure, such as method 700 of FIG. 7. Fluid pump system 800 can be implemented using an electronics system, such as control system 410 of FIG. 4 or machine learning system 515 of FIG. 5.

Fluid pump system 800, or a portion thereof, can be implemented as an application, a code library, a dynamic link library, a function, a module, other software implementation, or combinations thereof. In some aspects, fluid pump system 800 can be implemented in hardware, such as a ROM, a graphics processing unit, or other hardware implementation. In some aspects, fluid pump system 800 can be implemented partially as a software application and partially as a hardware implementation. Fluid pump system 800 is a functional view of the disclosed processes and an implementation can combine or separate the described functions in one or more software or hardware systems.

Fluid pump system 800 includes a data transceiver 810, a control system 820, and a result transceiver 830. The results, e.g., the operating commands, the recommendations, the analysis, and the interim outputs from control system 820 can be communicated to a data receiver, such as one or more of a user or user system 860, a computing system 862, a borehole system 864 (such as a downhole tool or downhole assembly, a reservoir controller, a well site controller, or other types of borehole systems), a constant speed power mechanism 866, a variable torque converter 868, a transmission 870, or a fluid pump 872. The results can be used as input into other systems, such as to change a transmission gear or to engage or disengage the lock-up clutch.

Data transceiver 810 can receive the input parameters, such as parameters to direct the operation of the analysis implemented by control system 820. The input parameters can include sensor data received from downhole sensors, surface sensors, rig sensors, drilling sensors, mud sensors, and other sensor types. The input parameters can include data from equipment, such as operating parameters of the constant speed power mechanism, transmission, pump, or variable torque converter. The input parameters can include user specified parameters such as pressure thresholds, fluid flow rate thresholds, load thresholds on the constant speed power mechanism, maximum rate of change of each of these aforementioned parameters, or optimal torque force parameters for each gear in the transmission. The input parameters can include other types of input as well. In some aspects, data transceiver 810 can be part of control system 820.

Result transceiver 830 can communicate one or more results, operating commands, analysis, or interim outputs, to one or more data receivers, such as user or user system 860, computing system 862, borehole system 864, constant speed power mechanism 866, variable torque converter 868, transmission 870, or fluid pump 872, whether located proximate result transceiver 830 or distant from result transceiver 830. Data transceiver 810, control system 820, and result transceiver 830 can be, or can include, conventional interfaces configured for transmitting and receiving data. In some aspects, control system 820 can be a machine learning system to improve the determination of when and how much to adjust the torque delivered to the pump using the variable torque converter.

Figure 9:
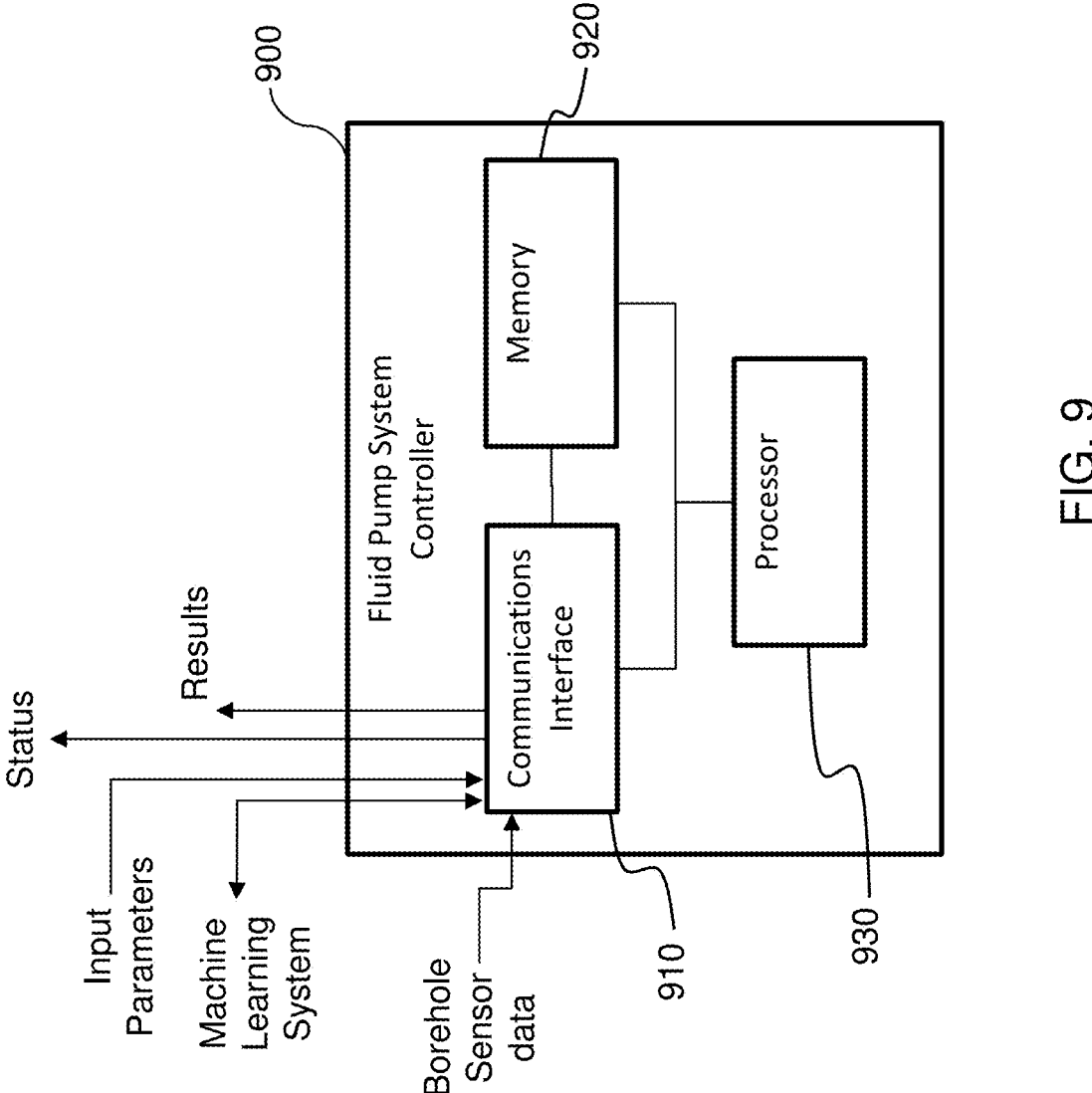
FIG. 9 is an illustration of a block diagram of an example of a fluid pump system controller according to the principles of the disclosure.

Control system 820 (e.g., one or more analyzation processors such as processor 930 of FIG. 9) can implement the analysis and algorithms as described herein utilizing the sensor data, the input parameters, and other algorithms that have been made available.

A memory or data storage of control system 820 can be configured to store the processes and algorithms for directing the operation of control system 820. Control system 820 can also include one or more processors that are configured to operate according to the analysis operations and algorithms disclosed herein and stored on the memory, and an interface to communicate (transmit and receive) data.

FIG. 9 is an illustration of a block diagram of an example of a fluid pump system controller 900 according to the principles of the disclosure. Fluid pump system controller 900 can be stored on a single computer or multiple computers. The various components of fluid pump system controller 900 can communicate via wireless or wired conventional connections. A portion or a whole of fluid pump system controller 900 can be located at one or more locations and other portions of fluid pump system controller 900 can be located on a computing device or devices located at a surface location or a downhole location. In some aspects, fluid pump system controller 900 can be partially or wholly located at a distant location from the borehole. In some aspects, fluid pump system controller 900 can be part of another system (such as a well site controller, a reservoir controller, a borehole controller, or other controller types), and can be integrated into a single device, such as a part of a borehole operation system, a well site controller, or other borehole system.

Fluid pump system controller 900 can be configured to perform the various functions disclosed herein including receiving input parameters, and generating results from an execution of the methods and processes described herein, such as generating operating commands for the equipment that are part of the fluid pump system. Fluid pump system controller 900 can implement control system 410, control system 510, machine learning system 515, or a combination thereof, for example, control system 510 and machine learning system 515 can be implemented using fluid pump system controller 900 or control system 820. Fluid pump system controller 900 includes a communications interface 910, a memory 920, and a processor 930.

Communications interface 910 is configured to transmit and receive data. For example, communications interface 910 can receive the input parameters. Communications interface 910 can transmit the results, data from the input parameters, or interim outputs. In some aspects, communications interface 910 can transmit a status, such as a success or failure indicator of fluid pump system controller 900 regarding receiving the various inputs, transmitting the generated results, or producing the results.

In some aspects, communications interface 910 can receive input parameters from a machine learning system, for example, where the machine learning system uses prior learned analyzation models to improve the determination of when and how much to change the torque delivered to the pump using the variable torque converter. The prior learned analyzation models can be trained using learning parameters from previous borehole operations at a borehole, borehole operations from other boreholes, or lab experimentation.

In some aspects, the machine learning system can be implemented by processor 930 and perform the operations as described by control system analyzer 820. Communications interface 910 can communicate via communication systems used in the industry. For example, wireless or wired protocols can be used. Communication interface 910 is capable of performing the operations as described for data transceiver 810 and result transceiver 830 of FIG. 8.

Memory 920 can be configured to store a series of operating instructions that direct the operation of processor 930 when initiated, including the code representing the algorithms for determining and processing the collected data. Memory 920 is a non-transitory computer-readable medium. Multiple types of memory can be used for data storage and memory 920 can be distributed.

Processor 930 can be configured to produce the results (e.g., generating the operating commands), one or more interim outputs, and statuses utilizing the received inputs. Processor 930 can be configured to direct the operation of fluid pump system controller 900. Processor 930 includes the logic to communicate with communications interface 910 and memory 920, and perform the functions described herein. Processor 930 is capable of performing or directing the operations as described by control system 820 of FIG. 8. Processor 930 can be one or more processors and be of one or more types of processors.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in aspects of different forms.

Specific aspects are described in detail and are shown in the drawings, with the understanding that the present disclosure is to be considered an exemplification of the principles of the disclosure, and is not intended to limit the disclosure to that illustrated and described herein. It is to be fully recognized that the different teachings of the aspects discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate array (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, or read-only memory (ROM), to enable various types of digital data processors or computers to perform one, multiple or all of the steps of one or more of the above-described methods, or functions, systems or apparatuses described herein.

Portions of disclosed examples or aspects may relate to computer storage products with a non-transitory computer-readable medium that has program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured or configured to means, for example, designed, constructed, or programmed, with the necessary logic or features for performing a task or tasks. Examples of program code include both machine code, such as produced by a compiler, and files containing higher-level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described aspects. It is also to be understood that the terminology used herein is for the purpose of describing particular aspects only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of aspects in the SUMMARY section can have one or more of the following additional elements in combination. Element 1: wherein the input parameters include a sensor measurement, where the sensor measurement is one or more of a downhole fluid pressure or a transmission gear selection parameter. Element 2: wherein the variable torque converter is a variable fill torque converter utilizing a torque oil. Element 3: wherein the variable torque converter is an eddy current clutch. Element 4: wherein the constant speed power mechanism is one of an engine or a motor. Element 5: wherein the constant speed power mechanism is a natural gas engine or a diesel engine. Element 6: wherein the constant speed power mechanism is an electric motor. Element 7: wherein the fluid is one of a drilling mud, a hydraulic fracturing fluid, an extraction fluid, or a cement. Element 8: wherein the borehole operation is one of a pressure test, a drilling operation, an extraction operation, or a hydraulic fracturing operation. Element 9: wherein the variable torque converter utilizes a scoop driver to adjust an amount of torque reduction. Element 10: where a position of the scoop driver is specified as an output parameter from the control system. Element 11: further comprising a multi-gear transmission capable of providing multiple gears for the torque delivered to the fluid pump, the fluid pump is physically coupled to the multi-gear transmission, and the multi-gear transmission is an electronically coupled system. Element 12: wherein the control system specifies a torque parameter for the variable torque converter when the control system specifies a gear change for the multi-gear transmission. Element 13: where the torque parameter is determined by a maximum fluid pressure of the fluid at the fluid pump. Element 14: wherein the multi-gear transmission is a power split transmission, and the power split transmission determines, utilizing an output parameter from the control system, a gear or pass-through utilized in delivering the torque to the fluid pump. Element 15: wherein the multi-gear transmission is a twin shaft transmission. Element 16: wherein the variable torque converter is located at one of between the constant speed power mechanism and the multi-gear transmission, between the multi-gear transmission and the fluid pump, or as part of the multi-gear transmission. Element 17: further comprising a lock-up clutch capable of coupling the constant speed power mechanism and the fluid pump to a desired torque force. Element 18: wherein a state of the lock-up clutch is controlled by the at least one operating command received from the control system. Element 19: wherein the input parameters to the control system includes a pressure of the fluid flowing through the fluid pump. Element 20: wherein the output parameters from the control system are one or more of a requested torque parameter for the variable torque converter or a gear change for a transmission. Element 21: further comprising a machine learning system capable of directing operations of the control system, wherein the machine learning system receives the input parameters communicated to the control system and learning parameters from previous borehole operations at the borehole, other borehole operations from other boreholes, or lab experimentation. Element 22: wherein the control system is further capable of directing the variable torque converter to increase the torque during pump start operations, to decrease the torque during pump soft end operations, to decrease the torque if a maximum fluid pressure is detected of the fluid in the fluid pump, or adjust the torque when a gear selection is made of a coupled transmission. Element 23: wherein the well system is part of a drilling borehole system, an injection borehole system, a hydraulic fracturing borehole system, a production borehole system, or a completed borehole system. Element 24: wherein the fluid pump system is capable of allowing one or more gears to be utilized within a connected transmission by adjusting delivered torque to the fluid pump. Element 25: wherein the fluid pump system is capable of preventing an overpressure of the fluid at the fluid pump. Element 26: wherein the fluid pump system is capable of allowing a soft start of the fluid pump and a soft end of the fluid pump by adjusting delivered torque to the fluid pump. Element 27: wherein the fluid pumping operation is a hydraulic fracturing operation. Element 28: wherein the fluid pumping operation is a drilling operation. Element 29: wherein the fluid pumping operation is a cement operation.

What is claimed is:

1. A fluid pump system for use with a borehole operation of a borehole, comprising:
   a constant speed power mechanism capable of generating a torque;
   a fluid pump capable of pumping a fluid suitable for the borehole operation using the torque generated by the constant speed power mechanism;
   a control system capable of collecting input parameters from and communicating output parameters to electronically coupled systems, and generating at least one operating command using the input parameters, wherein the at least one operating command is one of the output parameters and at least one of the input parameters is an equipment parameter of the fluid pump system;
   a machine learning system capable of receiving the input parameters and the output parameters from the control system and communicating recommended output parameters to the control system, wherein the input parameters include at least one of a downhole condition change or a composition of the fluid change, the machine learning system modifies the output parameters using learning parameters from previous borehole operations at the borehole, borehole operations from other boreholes, or lab experimentation to generate the recommended output parameters, and the control system regenerates the at least one operating command using the recommended output parameters as the input parameters to the control system; and
   a variable torque converter capable of reducing the torque generated by the constant speed power mechanism using the at least one operating command, prior to the torque being utilized by the fluid pump, wherein the variable torque converter, the constant speed power mechanism, and the fluid pump are electronically coupled systems.

2. The fluid pump system as recited in claim 1, wherein the input parameters include a sensor measurement, where the sensor measurement is one or more of a downhole fluid pressure or a transmission gear selection parameter.

3. The fluid pump system as recited in claim 1, wherein the variable torque converter is a variable fill torque converter utilizing a torque oil.

4. The fluid pump system as recited in claim 1, wherein the variable torque converter is an eddy current clutch.

5. The fluid pump system as recited in claim 1, wherein the constant speed power mechanism is one of an engine or a motor.

6. The fluid pump system as recited in claim 1, wherein the constant speed power mechanism is a natural gas engine or a diesel engine.

7. The fluid pump system as recited in claim 1, wherein the constant speed power mechanism is an electric motor.

8. The fluid pump system as recited in claim 1, wherein the fluid is one of a drilling mud, a hydraulic fracturing fluid, an extraction fluid, or a cement.

9. The fluid pump system as recited in claim 1, wherein the borehole operation is a hydraulic fracturing operation.

10. The fluid pump system as recited in claim 1, wherein the variable torque converter utilizes a scoop driver to adjust an amount of torque reduction, where a position of the scoop driver is specified as an output parameter from the control system.

11. The fluid pump system as recited in claim 1, further comprising:

a multi-gear transmission capable of providing multiple gears for the torque delivered to the fluid pump, the fluid pump is physically coupled to the multi-gear transmission, and the multi-gear transmission is an electronically coupled system.

12. The fluid pump system as recited in claim 11, wherein the control system specifies a torque parameter for the variable torque converter when the control system specifies a gear change for the multi-gear transmission, where the torque parameter is determined by a maximum fluid pressure of the fluid at the fluid pump, where the maximum fluid pressure is a maximum pressure of the fluid that can be handled within operating specifications of the fluid pump.

13. The fluid pump system as recited in claim 11, wherein the multi-gear transmission is a power split transmission, and the power split transmission determines, utilizing an output parameter from the control system, a gear or pass-through utilized in delivering the torque to the fluid pump.

14. The fluid pump system as recited in claim 11, wherein the multi-gear transmission is a twin shaft transmission.

15. The fluid pump system as recited in claim 11, wherein the variable torque converter is located at one of between the constant speed power mechanism and the multi-gear transmission, between the multi-gear transmission and the fluid pump, or as part of the multi-gear transmission.

16. The fluid pump system as recited in claim 1, further comprising:

a lock-up clutch capable of coupling the constant speed power mechanism and the fluid pump to a desired torque force, wherein a state of the lock-up clutch is controlled by the at least one operating command received from the control system.

17. The fluid pump system as recited in claim 1, wherein the input parameters to the control system includes a pressure of the fluid flowing through the fluid pump.

18. The fluid pump system as recited in claim 1, wherein the output parameters from the control system are one or more of a requested torque parameter for the variable torque converter or a gear change for a transmission.

19. The fluid pump system as recited in claim 1, wherein the machine learning system is a digital twin system of the control system.

20. The fluid pump system as recited in claim 1, wherein the control system is further capable of directing the variable torque converter to increase the torque during pump start operations, to decrease the torque during pump soft end operations, to decrease the torque if a maximum fluid pressure is detected of the fluid in the fluid pump, or adjust the torque when a gear selection is made of a coupled transmission.

21. A well system, comprising:

surface equipment for performing a borehole operation for a borehole formed through a subterranean formation, wherein the borehole is undergoing the borehole operation; and a fluid pump system located to deliver a fluid to the borehole, the fluid pump system including:

a constant speed power mechanism capable of operating at a constant speed and generating a torque;

a fluid pump capable of pumping the fluid suitable for the borehole operation, wherein the torque generated by the constant speed power mechanism is utilized by the fluid pump;

a control system capable of collecting input parameters from electronically coupled systems and communicating output parameters to the electronically coupled systems; p2 a machine learning system capable of receiving the input parameters and the output parameters from the control system and communicating recommended output parameters to the control system, wherein the input parameters include at least one of a downhole condition change or a surface condition change, the machine learning system modifies the output parameters using learning parameters from previous borehole operations at the borehole, borehole operations from other boreholes, or lab experimentation to generate the recommended output parameters, and the control system generates at least one operating command using the recommended output parameters as the input parameters to the control system; and a variable torque converter, by implementing the at least one operating command, is configured to reduce the torque generated by the constant speed power mechanism, utilizing a torque oil, prior to the torque being applied to the fluid pump, wherein the electronically coupled systems include at least the variable torque converter, the fluid pump, and the constant speed power mechanism.

22. The well system as recited in claim 21, wherein the well system is part of a hydraulic fracturing borehole system.

23. The well system as recited in claim 21, wherein the fluid pump system is capable of allowing one or more gears to be utilized within a connected transmission by adjusting delivered torque to the fluid pump.

24. The well system as recited in claim 21, wherein the fluid pump system is capable of preventing an overpressure of the fluid at the fluid pump.

25. The well system as recited in claim 21, wherein the fluid pump system is capable of allowing a soft start of the fluid pump and a soft end of the fluid pump by adjusting delivered torque to the fluid pump.

26. A method of performing a fluid pumping operation at a borehole, comprising:

locating a variable torque converter between a constant speed power mechanism and a fluid pump;

determining an event for the fluid pump, wherein the event is determined by a borehole operation plan or received sensor data;

generating an operating command from the event using a machine learning system capable of receiving input parameters from a control system and communicating recommended output parameters to the control system, wherein the input parameters include at least one of a fluid flow rate parameter, a fluid composition parameter, or a downhole fluid pressure, and the machine learning system utilizes learning parameters from previous borehole operations at the borehole, borehole operations from other boreholes, or lab experimentation, and the control system generates the operating command using the recommended output parameters as input parameters to the control system; and adjusting a torque delivered to the fluid pump by the constant speed power mechanism using the variable torque converter as directed by the operating command, wherein the constant speed power mechanism and fluid pump are located at a surface of the borehole, the fluid pump is capable of pumping borehole fluid down the borehole, and the borehole is for a hydrocarbon production operation.

27. The method as recited in claim 26, wherein the fluid pumping operation is a hydraulic fracturing operation.

28. The method as recited in claim 26, wherein the fluid pumping operation is a drilling operation.

29. The method as recited in claim 26, wherein the fluid pumping operation is a cement operation.

* * * * *